United States Patent
Vijayagopal et al.

(10) Patent No.: US 11,923,780 B2
(45) Date of Patent: *Mar. 5, 2024

(54) MATRIX CONVERTER CONTROL USING PREDICTED OUTPUT CURRENT

(71) Applicant: ITT Manufacturing Enterprises LLC, Wilmington, DE (US)

(72) Inventors: Manjusha Vijayagopal, Kochi (IN); César Armando Silva Jiménez, Viña del Mar (CL); Lee Empringham, Beeston Notthinghamshire (GB); Liliana Vittoria De Lillo, Beeston Notthinghamshire (GB)

(73) Assignee: ITT Manufacturing Enterprises LLC, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/960,722

(22) Filed: Oct. 5, 2022

(65) Prior Publication Data
US 2023/0170815 A1 Jun. 1, 2023

Related U.S. Application Data

(63) Continuation of application No. 17/175,341, filed on Feb. 12, 2021, now Pat. No. 11,509,231, which is a (Continued)

(30) Foreign Application Priority Data

Dec. 5, 2016 (GB) ..................... 1620647

(51) Int. Cl.
*H02M 5/293* (2006.01)
*H02M 5/297* (2006.01)
*H02M 7/5387* (2007.01)

(52) U.S. Cl.
CPC .......... *H02M 5/293* (2013.01); *H02M 5/297* (2013.01); *H02M 7/53876* (2021.05)

(58) Field of Classification Search
CPC ...... H02M 5/257; H02M 5/2573; H02M 5/27; H02M 5/271; H02M 5/275; H02M 5/293;
(Continued)

(56) References Cited

U.S. PATENT DOCUMENTS 4,468,725 A 8/1984 Venturini
5,491,370 A 2/1996 Schneider et al.
(Continued)

FOREIGN PATENT DOCUMENTS

CN 105548792 5/2016
EP 1311057 5/2003
(Continued)

OTHER PUBLICATIONS

Manjusha Vijayagopal, Pericle Zanchetta, Lee Empringham, Liliana De Lillo, Luca Tarisciotti, Patrick Wheeler; "Modulated model predictive current control for direct matrix converter with fixed switching frequency"; Oct. 29, 2015; IEEE; pp. 1-10 (Year: 2015).*

(Continued)

*Primary Examiner* — Thienvu V Tran
*Assistant Examiner* — Shahzeb K Ahmad
(74) *Attorney, Agent, or Firm* — Knobbe, Martens, Olson & Bear, LLP

(57) ABSTRACT

There is provided a method of generating a control strategy based on at least three switching states of a matrix converter. The at least three switching states are selected based on at least a predicted output current, associated with each switching state, and a desired output current. In particular, mathematical transformations of a desired output current as well (Continued)

as output currents associated with each of a plurality of switching states are used to identify appropriate switching states.

20 Claims, 11 Drawing Sheets

Related U.S. Application Data continuation of application No. 16/466,622, filed as application No. PCT/IB2017/056588 on Oct. 24, 2017, now Pat. No. 10,958,183.

(58) Field of Classification Search
CPC ........ H02M 5/297; H02M 5/45; H02M 5/458; H02M 5/273; H02M 5/2576; H02M 1/0003; H02M 1/0009; H02M 1/0054; H02M 1/08

See application file for complete search history.

(56) References Cited

U.S. PATENT DOCUMENTS

| | | | |
|---|---|---|---|
| 5,763,969 | A | 6/1998 | Metheny et al. |
| 5,939,807 | A | 8/1999 | Patyk et al. |
| 6,177,740 | B1 | 1/2001 | Burns |
| 7,362,017 | B2 | 4/2008 | Piper et al. |
| 7,911,093 | B2 | 3/2011 | Schueren |
| 8,315,077 | B2 | 11/2012 | Tadano |
| 10,958,183 | B2 | 3/2021 | Vijayagopal |
| 11,509,231 | B2 | 11/2022 | Vijayagopal et al. |
| 2001/0021116 | A1 | 9/2001 | Bruckmann et al. |
| 2003/0002306 | A1 | 1/2003 | Ziegler et al. |
| 2003/0202370 | A1 | 10/2003 | Simon |
| 2008/0285314 | A1 | 11/2008 | Kojori |
| 2010/0091534 | A1 | 4/2010 | Tadano |
| 2010/0149848 | A1 | 6/2010 | Urushibata et al. |
| 2011/0176340 | A1 | 7/2011 | Sakakibara |
| 2012/0020021 | A1 | 1/2012 | Kishimoto et al. |
| 2012/0201056 | A1 | 8/2012 | Wei et al. |
| 2013/0127251 | A1 | 5/2013 | Graovac et al. |
| 2015/0229233 | A1* | 8/2015 | Quevedo ............... H02M 7/483 318/812 |
| 2016/0352238 | A1* | 12/2016 | Ogasawara ............. H02M 5/04 |
| 2017/0160760 | A1 | 6/2017 | Blasko |

FOREIGN PATENT DOCUMENTS

| | | |
|---|---|---|
| EP | 1973222 | 9/2008 |
| EP | 1495533 | 3/2009 |
| JP | 2012-186924 | 9/2012 |
| JP | 2015-126632 | 7/2015 |
| RU | 2251199 C1 | 4/2005 |
| RU | 2559042 C1 | 8/2015 |

OTHER PUBLICATIONS

Abedi et al.: "Specialized predictive SVPWM current control of back-to-back converters for wind power generating systems", Power Electronics and Machines in Wind Applications (PEMWA), 2012 IEEE, IEEE, Jul. 16, 2012 (Jul. 16, 2012), pp. 1-7, XP032245163, DOI: 10.1109/PEMWA.2012.6316382, ISBN: 978-1-4673-1128-1.
Lee et al.: "Predictive current control for a sparse matrix converter", Power Electronics and Motion Control Conference (IPEMC), 2012 7$^{th}$ International, IEEE, Jun. 2, 2012 (Jun. 2, 2012), pp. 36-40, XP032215712, DOI: 10.1109/IPEMC.2012.6258840, ISBN: 978-1-4577-2085-7.
Rivera et al., "Predictive control with active damping in a Direct Matrix Converter", IEEE, pp. 1-6, Nov. 6, 2009.
Rivera et al.: "Predictive control of an indirect matrix converter operating at fixed switching frequency and without weighting factors", 2005 IEEE 24$^{th}$ International Symposium on Industrial Electronics (ISIE), IEEE, Jun. 3, 2015 (Jun. 3, 2015), pp. 1027-1033, XP033223069, DOI: 10.1109/ISIE.2015.7281613 [retrieved on Sep. 28, 2015].
Rodriguez et al.: "Predictive control of source and load currents in a direct matrix converter", Industrial Technology (ICIT), 2010 IEEE International Conference on, IEEE, Piscataway, NJ, USA, Mar. 14, 2010 (Mar. 14, 2010), pp. 1826-1831, XP031680983, ISBN: 978-1-4244-5695-6.
Vijayagopal et al., "Modulated model predictive current control for direct matrix converter with fixed switching frequency", IEEE, pp. 1-10, Oct. 29, 2015.
Vijayagopal et al., "Current control and reactive power minimization of a direct matrix converter induction motor drive with Modulated Model Predictive Control", IEEE, pp. 1-6, Oct. 5, 2015.
Wei et al., "A general space vector PWM control algorithm for multilevel inverters", IEEE, pp. 562-568, Feb. 19, 2003.
Wheeler et al., "A Fully Integrated 30kW Motor Drive Using Matrix Converter Technology," IEEE, downloaded on Mar. 25, 2009 in 6 pages.
Zhang et al.: "Simplified model predictive current control method of voltage-source inverter", Power Electronics and ECCE Asia (ICPE &ECCE), 2011 IEEE 8$^{th}$ International Conference on, IEEE, May 30, 2011 (May 30, 2011), pp. 1726-1733, XP031956055, DOI: 10.1109-ICPE.2011.5944459, ISBN: 978-1-61284-958-4.
European Search Opinion for Application No. EP17879494, dated Jun. 29, 2020 in 6 pages.
International Search Report for PCT Application No. PCT/IB2017/056588, dated Feb. 22, 2018, in 2 pages.
International Search Report and Written Opinion for PCT Application No. PCT/IB2017/056588, dated Feb. 22, 2018, in 15 pages.
International Preliminary Report on Patentability for PCT Application No. PCT/IB2017/056588, dated Jun. 11, 2019, in 7 pages.
Search Report for UK Application No. GB1620647.6, dated May 11, 2017, in 3 pages.
Supplementary European Search Report for Application No. EP17879494, dated Jun. 19, 2020 in 2 pages.
Second Chinese Office Action for Application No. 201780082564.6, dated Jan. 12, 2022, in 20 pages.
Notice of Reasons for Refusal for Japanese Application No. 2019-530169, dated Oct. 27, 2021, in 14 pages.
Search Report for Japanese Application No. 2019-530169, dated Oct. 25, 2021, in 20 pages.
Written Opinion for Japanese Application No. 2019-530169, dated Jan. 31, 2022, in 6 pages.
Notification of Reason for Refusal for Korean Application No. 10-2019-7018857, dated Feb. 5, 2022, in 13 pages.
Written Opinion for Korean Application No. 10-2019-7018857, dated Apr. 12, 2022, in 15 pages.
Examination Report of GB1620647.6, dated Sep. 23, 2021, in 2 pages.
Intention to Grant of GB1620647.6, dated Jan. 14, 2022, in 2 pages.
Notification of Grant of GB2557294, dated Mar. 1, 2022, in 2 pages.
Annexure to Form 3 in Indian Patent Application No. 201917022233, dated Aug. 12, 2021, in 1 page.
Russian Office Action for Application No. 2019120515, dated May 7, 2021, in 12 pages.
Russian Search Report for Application No. 2019120515, dated May 7, 2021, in 4 pages.
Examination Report of Indian Application No. 201917022233, dated Feb. 25, 2021, in 7 pages.
Preliminary Office Action from Brazilian Application No. BR112019011578-1, in 5 pages (translation included), dated Jul. 15, 2022.
Mexican Search Report for Application No. MX/a/2019/006502, dated May 24, 2022, in 9 pages (translation included).

* cited by examiner

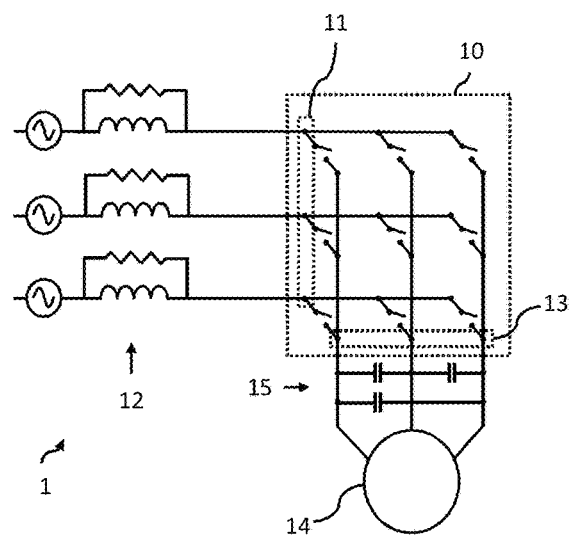
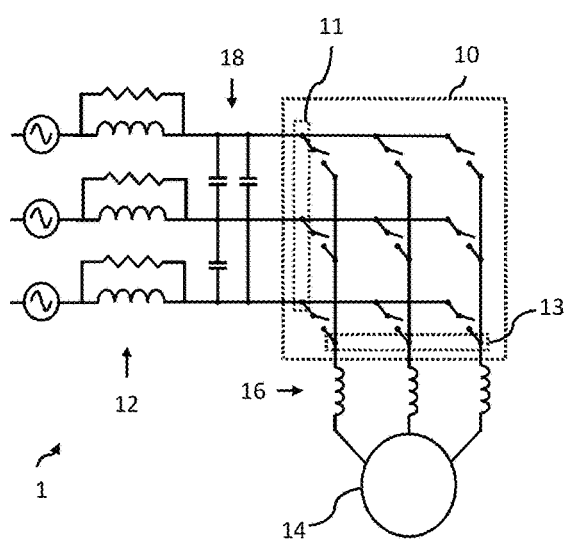
FIG. 1A                    FIG. 1B

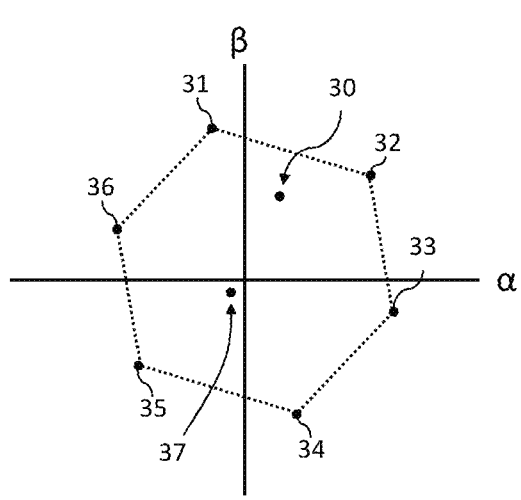
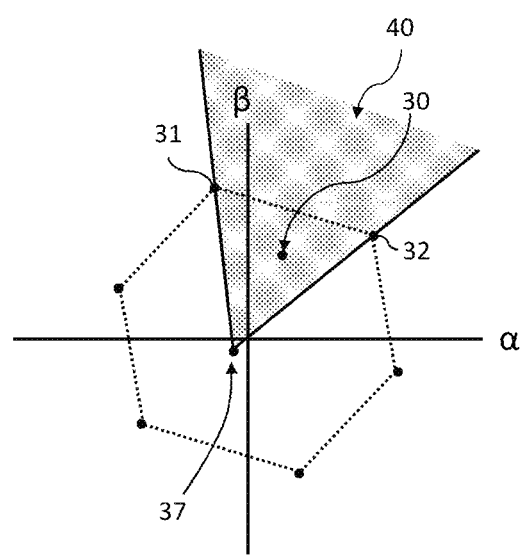
FIG. 3A
FIG. 3B

| $\frac{d_0}{4}$ | $\frac{d_1}{2}$ | $\frac{d_2}{2}$ | $\frac{d_0}{2}$ | $\frac{d_2}{2}$ | $\frac{d_1}{2}$ | $\frac{d_0}{4}$ |
|---|---|---|---|---|---|---|
| $v_0$ | $v_1$ | $v_2$ | $v_0$ | $v_2$ | $v_1$ | $v_0$ |

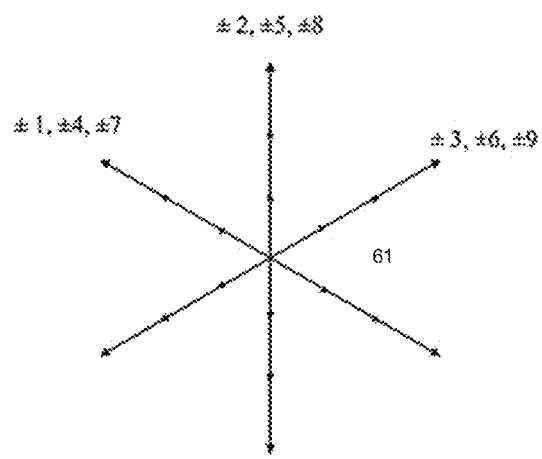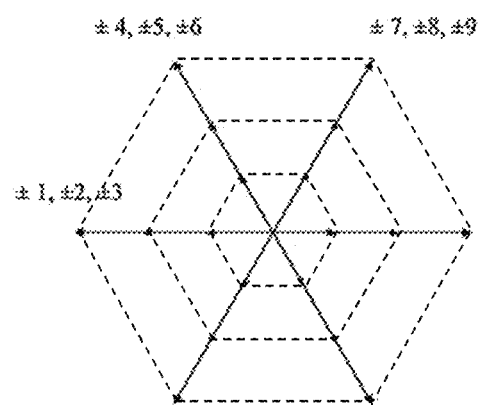
FIG. 6A                    FIG. 6B

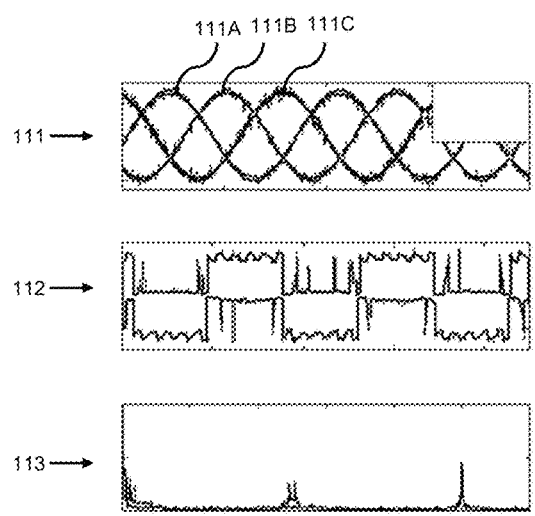 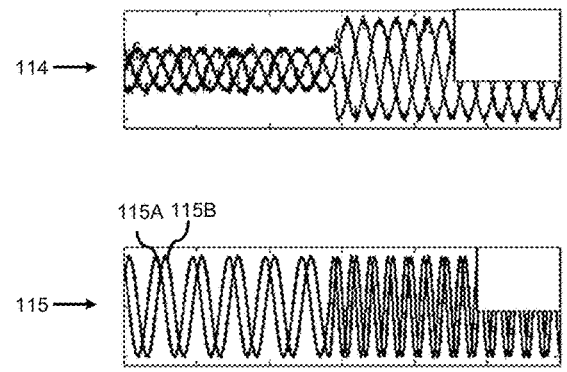
FIG. 11A
FIG. 11B

MATRIX CONVERTER CONTROL USING PREDICTED OUTPUT CURRENT

CROSS REFERENCE

This application is a continuation of U.S. patent application Ser. No. 17/175,341, filed Feb. 12, 2021, which is a continuation of U.S. patent application Ser. No. 16/466,622, filed Jun. 4, 2019, which is a U.S. National Phase of PCT International Application No. PCT/162017/056588, filed Oct. 24, 2017 and published as WO 2018/104808 on Jun. 14, 2018, which claims priority to Great Britain Application No. GB1620647.6, filed Dec. 5, 2016. The entire disclosure of each of the above-identified applications is hereby incorporated by reference.

NAMES OF PARTIES TO JOINT RESEARCH AGREEMENT

The subject matter disclosed in this application was developed and the claimed invention was made by, or on behalf of, ITT Inc. or its affiliates and/or the University of Nottingham, which are parties to a joint research agreement that was in effect on or before the effective filing date of the claimed invention. The claimed invention was made as a result of activities undertaken within the scope of the joint research agreement.

FIELD OF THE INVENTION

This invention relates to the field of matrix converters and more specifically to the field of control methods for matrix converters.

BACKGROUND OF THE INVENTION

A matrix converter is typically a single stage AC-AC converter that uses an array of switches to convert a first AC signal (of any number of phases) to a second AC signal (of any number of phases) with arbitrary magnitude and frequency. One advantage of a matrix converter is that it does not need any large energy storage elements.

Typical matrix converters require each switch in the array of switches to be a bidirectional switch capable of blocking voltage and conducting current in both directions. A two-diode two-transistor bidirectional switch is a known method of independently controlling the direction of the current within a matrix converter.

One known modulation technique for a matrix converter uses Space Vector Modulation (SVM) to perform modulation of the first AC signal. Several SVM techniques are known to those skilled in the art, such as three-zero, two-zero and one-zero methods.

An example of a matrix converter and an SVM technique may be understood with reference to EP 1311057 A1.

SUMMARY OF THE INVENTION

The invention is defined by the claims.

According to an embodiment, there is provided a method of generating a control strategy for a multi-phase output matrix convertor, the matrix converter being operable in a plurality of switching states, the method comprising: obtaining a target output transformation result representing a mathematical transformation result of a desired multi-phase output current of the matrix converter; identifying a plurality of switching states of the matrix converter; obtaining, for each switching state in the identified plurality of switching states, a predicted output transformation result representing a mathematical transformation result of a predicted output current for the switching state; identifying from the plurality of switching states at least three switching states, wherein, when mapped using a Cartesian co-ordinate system, a position of the target output transformation result is contained by an area defined by the positions of the predicted output transformation results associated with the at least three switching states; and generating a control strategy for the matrix converter based on the at least three switching states.

Embodiments thereby provide a method of generating a control strategy for a matrix converter based on predicted output currents of the matrix converter. Possible switching states of the matrix converter are each associated with a respective switching state, where each switching state may be associated with a respective predicted multi-phase output current. Mathematical transformations (e.g. an alpha-beta transformation) of both a desired multi-phase output current and these predicted output currents are used to identify which predicted output currents, and thereby switching states, are to be used in the control strategy.

In particular, at least three of the switching states are identified for which the mathematical transformations of the three switching states define an area which contains the mathematical transformation of the desired output current.

Thus, a method according to an embodiment selects which switching states are to be used in a control strategy based on at least a mathematical transformation of a predicted output current associated with each switching state, and a mathematical transformation of a desired output current of the matrix converter.

Embodiments allow for an enhanced control over the output current of a matrix converter, with a high degree of fidelity and reliability. Use of predicted output currents for determining switching states used in the control strategy enables a fast and accurate determination of control strategy to be maintained.

The obtaining, for each switching state in the identified plurality of switching states, a predicted output transformation result may comprise: obtaining, for each switching state, a predicted output transformation result from a simulated or mathematical model of the matrix converter and a load of the matrix converter.

Thus embodiments may comprise consulting or otherwise determining from a simulated or mathematical model of the matrix converter (and associated load) the predicted output currents associated with one or more switching states. In embodiments, the simulated or mathematical model may be a table or dataset comprising a predicted output current (or more preferably, mathematical transformations of the predicted output current) for each switching state for a variety of different possible loads and/or input currents. Other simulated or mathematical models will be apparent to the skilled person, such as a circuit simulation software package.

The obtaining, for each switching state in the identified plurality of switching states, a predicted output transformation result optionally comprises: predicting, using a simulated or mathematical model of the matrix converter and a load of the matrix converter, an output current of the matrix converter associated with each switching state in the identified plurality of switching states; and performing a mathematical transformation on the predicted output current associated with each switching state to thereby obtain a predicted output transformation result for each switching state in the identified plurality of switching states.

The identifying the at least three switching states may comprise: obtaining, for each switching state in the identified plurality of switching states, a predicted output transformation result error representing a predicted error between the predicted output transformation result associated with the switching state and the target output transformation result; and identifying at least three switching states, wherein, when mapped using a Cartesian co-ordinate system, a position of the origin is contained by an area defined by the positions of the predicted output transformation result errors associated with the at least three switching states.

Thus there is proposed a method of generating a control strategy based on a predicted error between a predicted output current by the matrix converter and a desired/target output current. In particular, there may be calculated, for each switching state/state of the matrix converter, a predicted error between a predicated output current by the matrix converter operating in that switching state and a desired/target output current.

An improved reliability can be obtained by determining the at least three switching states based on a predicted error between the predicted output current(s) and the desired output current.

In at least one embodiment, the selection of which switching states are to be used to generate the control strategy may be narrowed down further based on at least an input current associated with each switching state and/or an output voltage associated with each switching state.

The identifying a plurality of switching states may comprise: obtaining a target input transformation result representing a mathematical transformation result of a desired input current of the matrix converter; obtaining, for each possible switching state of the matrix convertor, an input transformation result representing a mathematical transformation result of a current input of the matrix converter associated with the possible switching state; identifying a plurality of input transformation results that are, when mapped using a Cartesian co-ordinate system, proximate to the position of the target input transformation result; and identifying the plurality of switching states associated with the identified plurality of input transformation results.

Embodiments thereby recognise that the number of switching states for which a predicted output current need be calculated may be reduced based on at least a desired input current.

Each switching state may be associated with a respective current input. Mathematical transformations of the current input of each switching state may be used to identify certain switching states further based on, for example, a mathematical transformation of the desired current input.

Thus, embodiments enable the control strategy to be generated further based on a desired input current of the matrix converter.

The identifying the plurality of switching states may comprise: obtaining, for each possible switching state of the matrix convertor, a second output transformation result representing a mathematical transformation result of a voltage output of the matrix converter associated with the possible switching state; and identifying the plurality of switching states based on a magnitude of the second output transformation results.

Embodiments enable the number of switching states for which a predicted output current need to be calculated to be reduced based on at least a magnitude of an output voltage of the matrix converter. In particular, it is recognised that each switching state may be associated with a respective output voltage.

Mathematical transformations of the respective output voltages for each switching state may be used to further identify or narrow down which switching states are to be used for generating the control strategy.

Thus, embodiments enable to control strategy to be generated further based on a voltage output of the matrix converter, and in particular, to a magnitude of voltage output by the matrix converter.

In at least one embodiment, the identifying the plurality of switching states based on a magnitude of the second output transformation results comprises identifying the plurality of switching states associated with the second output transformation results of the largest magnitude.

The identifying the at least three switching states may comprise: identifying a first switching state for which a voltage difference between all output terminals of the matrix converter operating according to the first switching state is substantially zero; identifying a second switching state for which a voltage difference between at least two output terminals of the matrix converter operating according to the second switching state is non-zero; and identifying a third switching state for which a voltage difference between at least two output terminals of the matrix converter operating according to the third switching state is non-zero.

Thus, embodiments may comprise identifying at least one zero switching state and one non-zero or active switching state.

The generating the control strategy may comprise calculating a duty cycle for the at least three switching states based on the target output transformation result; and generating the control strategy for the matrix converter based on the calculated duty cycles.

Preferably, the mathematical transformation is an alpha-beta transformation, such that the target output transformation result represents an alpha-beta transformation result of a desired multi-phase output current of the matrix converter and each predicted output transformation result represents an alpha-beta transformation result of a predicted output current for a respective switching state.

There is also proposed a computer program adapted to, when run on a computer, perform a method as previously described.

According to another embodiment of the invention, there is provided a modulation strategy generator for a three-phase to three-phase matrix convertor, the matrix converter being operable in a plurality of switching states, each switching state being associated with a respective switching state, the modulation strategy generator comprising a processor which is adapted to: obtain a target output transformation result representing a mathematical transformation result of a desired output current of the matrix converter; identify a plurality of switching states of the matrix converter; obtain, for each switching state in the identified plurality of switching states, a predicted output transformation result representing a mathematical transformation result of a predicted output current for the switching state; identify from the plurality of switching states at least three switching states, wherein, when mapped using a Cartesian co-ordinate system, a position of the target output transformation result is contained by an area defined by the positions of the predicted output transformation results associated with the at three switching states; and generate a modulation strategy for the matrix converter based on at least three switching states.

The modulation strategy generator may be adapted to obtain, for each switching state, the predicted output transformation result from a simulated model of the matrix converter.

The modulation strategy generator may be adapted to predict, using a simulated model of the matrix converter, an output current of the matrix converter associated with each switching state in the identified plurality of switching states; and perform a mathematical transformation on the predicted output current associated with each switching state to thereby obtain the predicted output transformation result for each switching state in the identified plurality of switching states.

The modulation strategy generator may be adapted to: obtain, for each switching state in the identified plurality of switching state, a predicted output transformation result error representing a predicted error between the predicted output transformation result associated with the switching state and the target output transformation result; and identify the at least three switching state, wherein, when mapped using a Cartesian co-ordinate system, a position of the origin is contained by an area defined by the positions of the predicted output transformation result errors associated with the at least three switching states.

BRIEF DESCRIPTION OF THE DRAWINGS

Examples of the invention will now be described in detail with reference to the accompanying drawings, in which:

FIGS. 1A, 1B and 1C each illustrate a matrix converter;

FIGS. 3A and 3B illustrate mathematical transformations of predicted output currents for a plurality of switching states of the matrix converter;

FIG. 6A illustrates mathematical transformations of current input for a plurality of switching states of the matrix converter.

FIGS. 6B-6C each illustrate mathematical transformations of voltage output for a plurality of switching states of the matrix converter;

FIGS. 11A and 11B illustrate experimental results of a system according to an embodiment.

DETAILED DESCRIPTION OF THE EMBODIMENTS

According to an embodiment of the invention, there is provided a method of generating a control strategy based on at least three switching states of a matrix converter. The at least three switching states are selected based on at least a predicted output current, associated with each switching state, and a desired output current. In particular, mathematical transformations of a desired output current as well as output currents associated with each of a plurality of switching states are used to identify appropriate switching states.

Embodiments are at least partly based on the realisation that a control strategy that enables reliable and responsive control of a matrix converter may be generated based on predicted output currents and a desired output current. Embodiments provide reliable methods of identifying suitable switching states of a matrix converter to be used in generation of a control strategy.

Illustrative embodiments may, for example, be employed in electrical drives or integrated drives which use a matrix converter. Other implementation strategies of such matrix converters will be readily apparent to the skilled person.

Figure 1C:
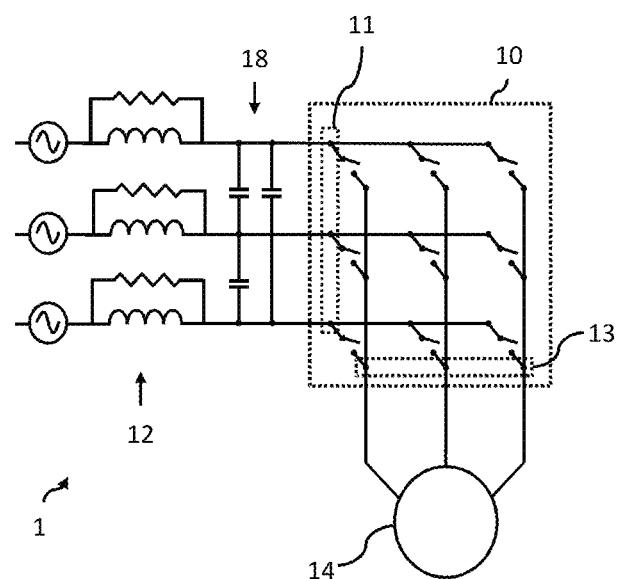

FIGS. 1A, 1B and 1C each illustrate a matrix converter 10 adapted to convert a three-phase input signal to a three-phase output signal according to different embodiments.

The matrix converter 5 comprises three input nodes 11 each connected to receive a respective phase of an input signal from a three-phase AC power supply 12. The matrix converter further comprises three output nodes 13 each connected to provide a respective phase of an output signal to a load 14.

The voltage supply 12 may, for example, be a typical three-phase mains supply or other three-phase AC power supply. The voltage supply 12 may for example, be modelled as three voltage or current sources, each associated with a different phase. Each voltage or current source may be provided with an inductor and a damping resistor connected in parallel, each pair of inductor and damping resistor connecting a respective voltage or current source to a respective input node 11.

The load 14 may, for example, be a capacitive load or an inductive load, such that the matrix converter may comprise, as illustrated in FIG. 1A, a capacitive port 15 or, as illustrated in FIG. 1B, an inductive port 16 or both.

Of course, it will be appreciated that in some embodiments, such as that illustrated by FIG. 1C, a matrix converter 1 need not comprise a specific output port. Such embodiments may be used, for example, if the load 14 comprises an induction machine.

Each output node 13 is connectable to each input node 11 by a respective bidirectional switch. The matrix converter 10 thereby comprises an array of nine (3×3) bidirectional switches.

A capacitor arrangement 18 may be provided, as illustrated in FIG. 1B, so as to provide a path for the inductive current of each phase. Such a capacitor arrangement may not be required, for example, if the matrix converter comprises a capacitive port 15, such as that illustrated by FIG. 1A.

In order to prevent line-to-line short circuits (of the voltage source), no two bidirectional switches associated with a single output node should be switched on at any given moment. Similarly, to ensure there is a path for the inductive current of each phase of the input signal, via the capacitor arrangement 18 or the capacitive port 15, no output node 13 should be disconnected from every input node 12. This prevents large over-voltages from occurring. In other words, each output node 13 must always be connected to receive a phase of the voltage source 12. These two restrictions allow for improved device safety, reliability and longevity.

As will be apparent to the skilled person, a matrix converter 10 is operable in a finite number of switching states, each switching state representing a different open-and-close configuration of the bidirectional switches. For the matrix converter 10 of FIG. 1, there are only 27 switching states which comply with the above-identified restrictions.

As used herein, a 'zero switching state' is defined to be a switching state in which the voltage between each output node and a reference voltage is substantially the same. For example, each output node 13 may be connected to a same input node 11. As such, there is no or negligible voltage difference between any of the output nodes 13 (as each output node is at the same voltage).

A 'non-zero switching state' or 'active switching state' is defined to be a switching state in which the voltage difference between each of at least two output nodes and a reference voltage is different. For example, two or more output nodes may be connected to different input nodes. As such, there is a voltage difference between at least two output nodes.

A control strategy may be used to define which output node is connected to which input node at any given time (i.e. which switching state a matrix converter operates in). Such a control strategy may enable modulation of the voltage supply to the load. In particular, a pulse width modulation control strategy may be used to define how long a matrix vector is operated in a particular switching state.

A controller (not shown), such as a field-programmable gate array (FPGA), may use the control strategy to control the switching of the bidirectional switches. By way of example only, a controller may provide a variable voltage connection to one or more transistors of each bidirectional switches in order to control the conductivity of the transistor (s), thereby enabling control of the bidirectional switch.

Figure 2:
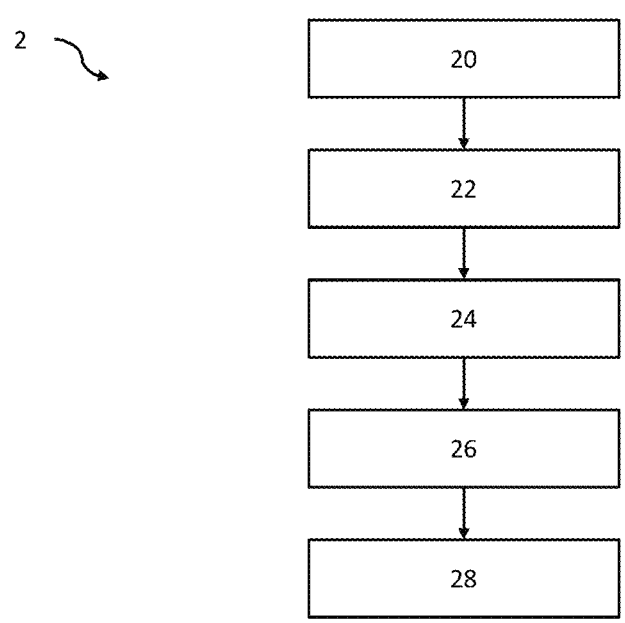
FIG. 2 is a flowchart illustrating a method according to an embodiment.
Figures 4, 5:
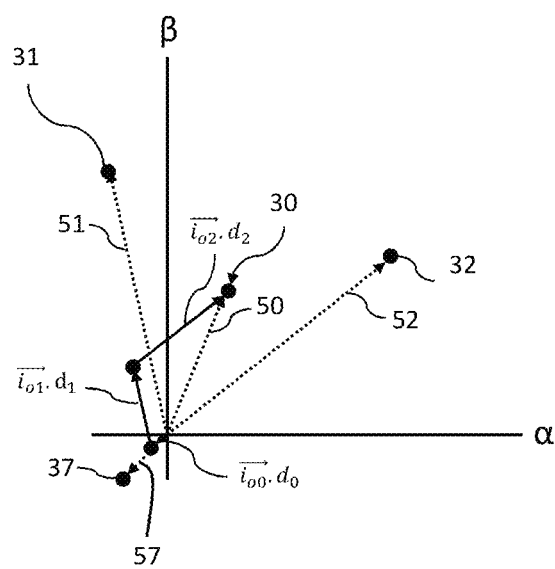
FIG. 4 illustrates predicted output current vectors for a plurality of switching states of the matrix converter.
FIG. 5 illustrates a control strategy according to an embodiment.

With further reference to FIGS. 2 to 4, there will be described a method 2 of generating a control strategy for a multi-phase output matrix converter 10 according to an embodiment.

For embodiments hereafter described, transformation results generally refer to results of an alpha-beta transformation of a multi-phase signal. Of course, other results of mathematical transformations of a multi-phase signal may be used to various advantages, such as a direct-quadrature-zero transformation, also known as a dq0, dqo, 0dq or odq transformation. Generally speaking, a mathematical transformation changes the reference frame of a particular multi-phase signal, and preferably provides a two-dimensional or two-part result in an analogous manner to a complex value. It will be understood by the skilled person that such a result may be represented as a pair of numbers (e.g. co-ordinates), or by a corresponding vector.

FIG. 2 illustrates a flowchart of the method 2 for generating the control strategy according to an embodiment.

FIGS. 3 and 4 each illustrate transformation results associated with a desired output current and predicted output currents of the matrix converter, plotted using a Cartesian coordinate system in a mathematical (e.g. alpha-beta) plane.

The method comprises obtaining 20 a target output transformation result 30 representing a mathematical (e.g. alpha-beta) transformation result of a desired multi-phase output current of the matrix converter 10. The target output transformation result 30, when considered as a vector from the origin, may be considered as a target output current vector.

The method further comprises identifying 22 a plurality of switching states associated with the matrix converter 10. This may comprise, for example, identifying only a subset or selection of all available switching states of the matrix converter 10 for further processing. In other examples, all switching states associated with the matrix converter are identified for further processing.

Preferably, the identified plurality of switching states comprises at least one zero switching state and two or more non-zero switching states. Even more preferably, the identified plurality of switching states comprises at least one zero switching state, and six or more non-zero switching states.

The method further comprises obtaining 24, for each identified switching state, a predicted output transformation result 31, 32, 33, 34, 35, 36, 37 representing a mathematical (e.g. alpha-beta) transformation result of a predicted multi-phase output current for a matrix converter 10 operating in accordance with the respective switching state. Each predicted output transformation result, when considered as a vector from the origin, may be considered as a predicted output current vector associated with a respective switching state.

Thus, FIGS. 3 and 4 may illustrate predicted output current vectors 31, 32, 33, 34, 35, 36, 37 associated with predicted output currents of an identified plurality of switching states, as well as a target output current vector 30 associated with a target/desired output current.

The alpha-beta transformation results of a predicted output current (i.e. the predicted output current vectors) may be obtained, for example, from a model or simulation of the matrix converter and an associated load, which may be a predicted load or a default load. For example, a model may comprise a dataset or table, or, in some embodiments, may comprise circuit simulation software. The output current may be considered to be the current provided to a load (i.e. a load current).

Equations (1) and (2) illustrate a predictive load model for a simple RL load (having resistance R and an inductance L). The equations make use of the switching period Ts (being the reciprocal of the switching frequency).

$$I_o^j(k+1) = \left(1 - \frac{RT_s}{L}\right)I_o(k) + \frac{T_s}{L}V_o^j(k) \quad (1)$$

$$e_j = I_o^j(k+1) - I_o(k) \quad (2)$$

where $I_0(k+1)$ and $I_0(k)$ are the load currents at (k+1) and k instants respectively for j={0, 1, 2 . . . } where j is the identified switching state.

It has been recognised that different switching states are associated with different predicted output currents, which are respectively represented by the different output transformation results defining predicted output current vectors.

As illustrated by FIGS. 3A and 3B, transformation results 31, 32, 33, 34, 35, 36, 37 of the predicted output currents may form one or more skewed polygons, here a single skewed hexagon with an offset centre.

The method 2 further comprises identifying 26 at least three switching states, for which the associated predicted output transformation results 31, 32, 37 define an area 40 or region in which the target output transformation result 30 is located. Thus, switching states, associated with at least three predicted output current vectors 31, 32, 37 defining an area 40 containing the target output transformation result 30, may be identified.

The method may therefore comprise identifying 26 at least three switching states which are used to generate the control strategy.

The identifying at least three switching states preferably comprises identifying at least one zero switching state (i.e. associated with a zero switching state transformation result 37) and at least two non-zero switching states (i.e. associated with a first 31 and second 32 non-zero switching state transformation result).

Although zero switching states provide a same voltage between output nodes of the matrix converter, an output current provided by a matrix converter operating according to a zero switching state may be non-zero (e.g. due to properties of a load, such as inductance, resistance, impedance, back electromagnetic field effects and so on). This is best illustrated by FIG. 3A, which identifies a mathematical transformation 37 of a predicted output current associated with a zero switching state as non-zero.

In particular, as illustrated in FIG. 3B, an area containing the target output transformation result may be defined in the following way. A predicted output transformation result 37 associated with a particular zero switching state (i.e. a zero switching state transformation result 37) may define a centre of circle of infinite diameter. The method may comprise identifying a first non-zero vector (associated with a first non-zero switching state transformation result 31) and a second non-zero vector (associated with a second non-zero switching state transformation result 32) for which a sector of this circle, when bounded on one side by a line beginning at the zero switching state transformation result 37 and intersecting the first non-zero switching state transformation result 31 and on the other side by a line beginning at the zero switching state transformation result 37 and intersecting the second non-zero switching state transformation result 32, defines an area in which the target output transformation result 30 is positioned.

By way of another example, the predicted output transformation results 31, 32, 37 of the identified at least three switching states may define vertices of an area, such as a triangle, which contains the target output transformation result 30.

By way of yet another example, the identifying the at least three switching states may comprise identifying the three predicted output transformation results 31, 32, 37 most proximate to the target output transformation result 30, and identifying the associated switching states.

In this way, the method 2 selects which switching states are to be used in the generation of the control strategy based on at least mathematical transformations of a predicted output current of the matrix converter for different switching states and a mathematical transformation of a desired output current of the matrix converter.

The method 2 further comprises generating 28 a control strategy for the plurality of identified switching states. The generating 28 may comprise determining appropriate duty cycles for each switching state in the plurality of identified switching states and generating a control scheme based on the identified duty cycles.

With further reference now to FIG. 4, and as briefly described earlier, each transformation result 31, 32, 37 may be considered to be a predicted output current vector associated with a respective switching state or switching state.

By way of example, a first non-zero switching state transformation result 31 may be associated with a first predicted current vector 51, $\vec{l}_{o1}$, a second non-zero switching state transformation result 32 may be associated with a second predicted current vector 52, Z, and the zero switching state transformation result 37 may be associated with a zeroth predicted current vector 57, $\vec{l}_{o0}$. Similarly, the target output transformation result 30 may be associated with a target current vector 50, $\vec{l}_{ot}$.

The generating a control strategy may comprise identifying the linear combination of the first 51 and second 52 predicted current vectors and the zeroth predicted current vector which results in the target current vector 50. The calculated duty cycle for each predicted current vector is assigned as the duty cycle of its associated switching state.

In particular, the appropriate linear combination may be calculated by considering the following equations.

$$\vec{l}_{o1} \cdot d_1 + \vec{l}_{o2} \cdot d_2 + \vec{l}_{o0} \cdot d_0 = \vec{l}_{ot} \quad (3)$$

$$d_1 + d_2 + d_0 = 1 \quad (4)$$

Where $\vec{l}_{o1}$ represents the first predicted current vector, $\vec{l}_{o2}$ represents the second predicted current vector, $\vec{l}_{o0}$ represents the zeroth predicted current vector, $\vec{l}_{ot}$ represents the target current vector, $d_1$ represents the duty cycle of the first predicted current vector, $d_2$ represents the duty cycle of the second predicted current vector and $d_0$ represents the duty cycle of the zeroth predicted current vector.

The resultant vectors $\vec{l}_{o1} \cdot d_1$, $\vec{l}_{o2} \cdot d_2$ and $\vec{l}_{o0} \cdot d_0$ are illustrated in FIG. 4 for the purposes of clarity. As will be apparent, the combination of these three resultant vectors results in the target current vector 50.

In this way, duty cycles (i.e. relative operation time) for each predicted current vector which results in the appropriate target vector may be calculated. A control strategy for the plurality of identified switching states may be calculated based on the determined duty cycles.

For example, with reference to FIG. 5, generating the control strategy may comprise generating a double sided switching pattern for the matrix controller based on the calculated duty cycles for the predicted current vectors.

A zero switching state $v_0$ associated with the zeroth predicted current vector $\vec{l}_{o0}$ may have its calculated duty cycle $d_0$ divided into three portions, two of an equal size and one twice the size of the others. A first non-zero switching state $v_1$ associated with the first predicted current error $\vec{l}_{o1}$ may have its calculated duty cycle $d_1$ evenly divided into two portions. Similarly, a second non-zero switching state $v_1$ associated with the second predicted current error $\vec{l}_{o2}$ may have its calculated duty cycle $d_2$ evenly divided into two portions.

The divided portions of the duty cycles may be arranged in a pattern as illustrated in FIG. 5.

Proposed embodiments enable fast dynamic response without compromising on the quality of output signals or waveforms by the matrix converter.

Proposed methods may be used to predict the output voltage with improved accuracy since the dynamics of an input filter mean that the output voltage generated by other control strategies such as SVM may be inaccurate.

In some embodiments, the predicted current vector may be a predicted input current vector, so as to enable control over the input current to the matrix converter.

A more detailed embodiment of generating a control strategy will be described with reference to FIGS. 6A to 7.

In embodiments, the identifying a plurality of switching states of the matrix converter may comprise iteratively limiting or narrowing down a selection of switching states to identify only a portion of all available switching states. A number of possible methods may be used to narrow down or limit this selection.

As previously mentioned, for the matrix converter 10 of FIG. 1, there are only 27 switching states which comply with certain restrictions. Of these, six are considered rotating or synchronous switching states that only provide changes in magnitude and direction between the input nodes and the output nodes. For the sake of simplicity, in at least one embodiment, there is no need to consider these switching states. The remaining vectors/switching states may be referred to as: 0 (i.e. zero switching states), ±1, ±2, ±3, ±4, ±5, ±6, ±7, ±8, and ±9. It is noted that there are three zero switching states.

The present invention recognises that the number of switching states may be further or otherwise narrowed down by limiting to switching states which meet particular criteria for input/output signals.

By way of example, the number of switching states may be narrowed down based on a multi-phase input current of the matrix converter and/or a multi-phase output voltage of the matrix converter.

A matrix converter 10 operating in accordance with a particular switching state may be associated with a respective input current vector, which is representative of an input current of the matrix converter operating in the particular switching state.

Similarly, a matrix converter 10 operating in accordance with a particular switching state may be associated with a respective output voltage vector, which is representative of an output voltage of the matrix converter operating in the particular switching state.

That is, each switching state is associated with a respective input current vector and an output voltage vector, as illustrated in FIGS. 6A and 6B.

FIG. 6A illustrates input current vectors for a matrix converter 10, each being a mathematical (e.g. alpha-beta) transformation result of an input current of the matrix converter 10 associated with a respective switching state.

FIG. 6B illustrates output voltage vectors for a matrix converter 10, each being a mathematical (e.g. alpha-beta) transformation result of a voltage output by the matrix converter 10 for each respective switching state.

The selection of switching states may be limited to only those switching states for which the associated input current vector is proximate to a desired input current vector. Thus, a desired input current, associated with a desired input current vector, may define which switching states are selected.

The selection of switching states may be based on a magnitude of the associated output voltage vectors.

For example, in some embodiments only switching states having an output voltage vector of the greatest magnitude (e.g. the outermost output voltage vectors of FIG. 6B) may be selected. This may ensure a maximum power output of the matrix converter.

In other examples, only the switching states having an output voltage vector of the lowest magnitude may be selected. This may ensure an increased control over the input current angle.

More than one method of limiting which switching states are identified may be used to particular advantage.

In one scenario, with reference to FIG. 6A, a desired input current transformation result lies within a first sector 61. Switching states that can produce an input current in that sector are ±3, ±6, ±9, ±1, ±4 and ±7. The plurality of switching states is firstly limited to these identified switching states, i.e. an initial set of 12 switching states.

Figure 6C:
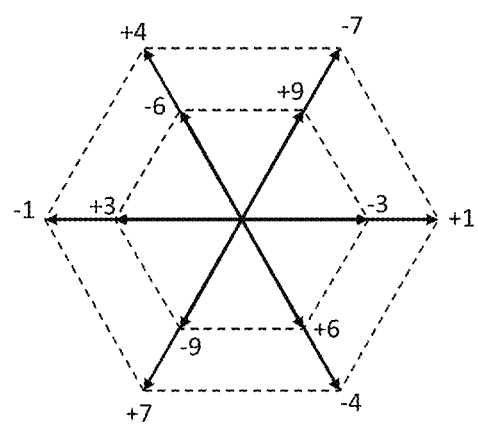

FIG. 6C illustrates the output voltage vectors for the above scenario in which the selection of switching states has been initially narrowed down to select only the switching states ±3, ±6, ±9, ±1, ±4 and ±7, each being associated with an input current that may provide the desired input current.

The distribution of the output voltage vectors for each of these switching states is illustrated in FIG. 6C.

In an embodiment, only those switching states which are associated with the output voltage vectors with greatest magnitude are selected (i.e. those voltage vectors lying in the outer hexagon of FIG. 6C).

Thus, by way of example, the switching states ±4, ±7 and ±1 may be selected as the identified plurality of switching vectors for further processing.

Embodiments recognise that a switching state of a matrix converter may be associated with a plurality of vectors representing different parameters of the matrix converter. As described previously, a switching state may be associated with: a predicted output current vector (representing a predicted multi-phase output current of a matrix converter operating according to the switching state); a input current vector (representing a multi-phase current input to the matrix converter operating according to the switching state) and a voltage output switching vector (representing a multi-phase voltage output by the matrix converter operating according to the switching state).

Embodiments also recognise that the identification of switching states for which a control strategy is generated may be based on (characteristics of) a plurality of vectors associated with each switching state.

According to a preferred embodiment, obtaining a predicted output transformation result (i.e. a predicted current vector) for each identified switching state comprises obtaining a predicted current error vector for each identified switching state.

A predicted current error vector may be represented by the mathematical (e.g. alpha-beta) transformation result of a predicted error between an output current of the matrix converter for an associated switching state and a desired output current. Thus, an error between a predicted output current and a desired output current may be calculated for each relevant switching state. A mathematical transformation of this error may represent the predicted current error vector of that switching state.

In other or further embodiments, a predicted current error vector of a switching state may be modelled as a difference between a transformation result of a predicted output current associated with the switching state and a transformation result of a desired output current.

Thus, there may be considered a predicted output transformation result error which represents a predicted error between the predicted output transformation result associated with the switching state and the target output transformation result.

Figure 7:
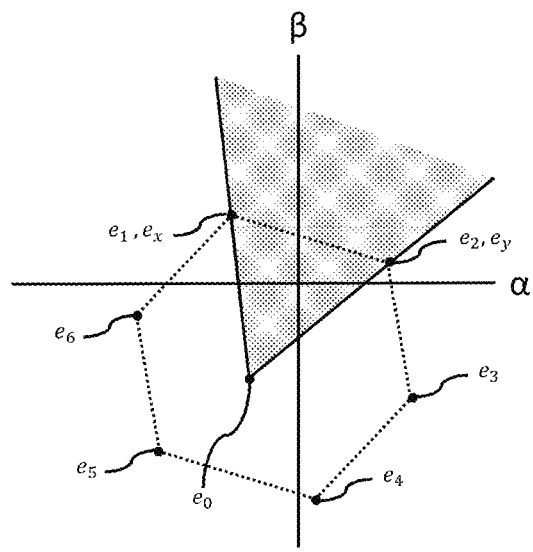
FIG. 7 illustrates mathematical transformations of predicted output current errors for a plurality of switching states of the matrix converter.

FIG. 7 illustrates the predicted current error vectors $e_1$, $e_2$, $e_3$, $e_4$, $e_5$, $e_6$, for a plurality of identified switching states. Thus, FIG. 7 illustrates transformation results associated with predicted multi-phase output current errors of the matrix converter for different switching states, plotted using a Cartesian coordinate system in a mathematical (e.g. alpha-beta) plane.

According to an embodiment, there is an objective to minimize or obtain zero output current error. The target is therefore the origin of the plane (0,0). It may thereby be understood that the 'target output transformation result', as described with reference to FIGS. 2-5, is presently embodied as the origin of the plane. That is, the target output transformation result may be a point positioned at (0,0).

The predicted current error vectors illustrated in FIG. 7 include at least one zero switching state predicted current error vector $e_0$ (being the predicted current error vector associated with a zero switching state) and a plurality of non-zero switching state predicted current error vectors, each associated with a respective non-zero switching state. The other predicted current error vectors include at least a first predicted current error vector $e_1$, a second predicted current error vector $e_2$, as well as third $e_3$, fourth $e_4$, fifth $e_5$, and sixth $e_6$ predicted current error vectors.

The control problem is to find the linear combination of at least three predicted current error vectors which will result in zero current error (i.e. targeting the origin). This may be obtained by a linear combination of the zero switching state predicted current error vector and non-zero switching state predicted current error vectors.

In particular, a solution exists if the target (origin) lies within an area formed the zero switching state predicted current error vector and at least two non-zero switching state predicted current error vectors. If the target (origin) lies outside this area, it is considered as the over-modulation condition, and different measures, described later, need to be taken to address it.

In particular embodiments, it may be determined that the solution exists if the target lies within an area defined by the zero switching state predicted current error vector and two adjacent non-zero switching state predicted current error vectors. A first non-zero switching state predicted current error vector $e_1$ may be considered to be adjacent to a second non-zero switching state predicted current error vector $e_2$ if the second non-zero switching state predicted current error vector $e_2$ is one of the two most proximate non-zero switching state predicted current error vectors to the first non-zero switching state predicted current error vector $e_1$.

For each pair of adjacent non-zero switching state predicted current error vectors, a solution exists if the following conditions are met:

$$(e_x - e_0) \times (-e_0) \cdot (e_y - e_0) \times (-e_0) \leq 0 \quad (5)$$

$$(e_x - e_0) \cdot (-e_0) > 0 \quad (6)$$

$$(e_y - e_0) \cdot (-e_0) > 0 \quad (7)$$

where $e_x$ is one of the non-zero vector predicted current error vector, and $e_y$ is an adjacent non-zero vector predicted current error vector.

The solution for the embodiment illustrated by FIG. 7 is $e_x = e_1$ and $e_y = e_2$.

The adjacent pair of non-zero vector predicted current error vectors that meet these requirements are selected (i.e. used as $e_x$ and $e_y$), together with the zero switching state predicted current error vector $e_0$, in order to generate a control strategy.

The linear combination of these vectors to obtain the target (i.e. the origin) can then be obtained by solving the following set of linear equations $$(e_{x\alpha} - e_{0\alpha}) \cdot d_1 + (e_{y\alpha} - e_{0\alpha}) \cdot d_2 = -e_{0\alpha} \quad (8)$$

$$(e_{x\beta} - e_{0\beta}) \cdot d_1 + (e_{y\beta} - e_{0\beta}) \cdot d_2 = -e_{0\beta} \quad (9)$$

$$d_1 + d_2 + d_0 = 1 \quad (10)$$

where $d_1$ and $d_2$ are the respective duty cycles for the adjacent pair of non-zero switching state predicted current error vectors that meet the conditions of equations (5)-(7), and $d_0$ is the duty cycle for the zero switching state predicted current error vector.

However, if $d_1 + d_2 > 1$, this implies that the target point (the origin) lies outside the hexagon formed by area bordered by the non-zero switching state predicted current error vectors $e_1, e_2, e_3, e_4, e_5, e_6$ (i.e. the other predicted current error vectors). In this case, an attempt to reach the target point (the origin) is achieved by modulating between the adjacent pair of non-zero vector predicted current error vectors $e_x, e_y$. That is, the method comprises identifying a duty cycle for the adjacent pair of non-zero vector predicted current error vectors that meet these requirements of equations (5)-(7) that results in a resultant vector closest to the origin.

Generating a strategy on this basis generates accurate duty cycles depending upon the error predictions, and results in fixed switching frequency operation. Due to at least the fact that the control strategy is generated on a predicted output current, the control strategy will have fast transients.

Proposed control methods provide a fast dynamic response, e.g. to a change in desired or target output current of the matrix converter, with little compromise of the quality of the controlled waveforms or output signals.

Moreover, the steady state performance may be improved due to the modulation approach included in the method. Thus, a combination of predictive control and appropriate modulation described herein results in a good steady state performance with a fast dynamic response.

This embodiment is considered to be a method of direct predictive current-error vector control (DPCVC). There is proposed a concept of considering the current error in its vector form in a transformed plane (such as the $\alpha\beta$ plane) as a cost function in order to calculate the duty cycles or application times for the converter switching states. The objective is to minimize the load current error, making it equal to zero if possible. Therefore, the target point to achieve when the load current errors are plotted is the origin of the plane.

Figure 8:
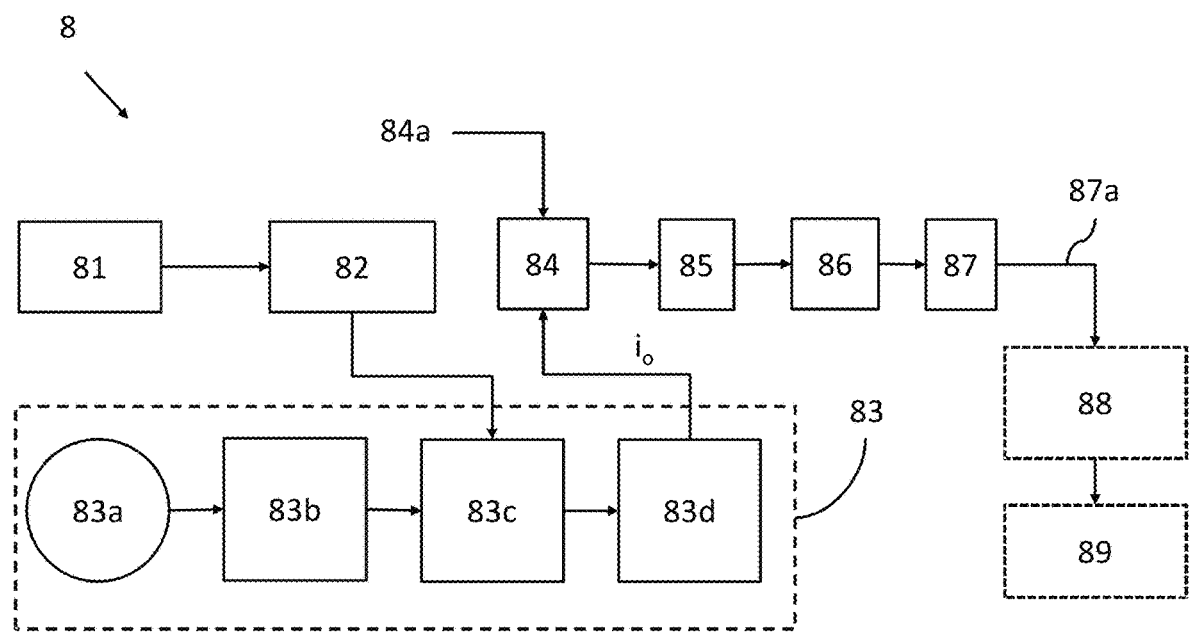
FIG. 8 illustrates a control strategy generator according to an embodiment.

FIG. 8 illustrates a control strategy generator 8 according to an embodiment. The control strategy generator 8 is adapted to generate a control strategy 87a for a matrix converter controller 88 adapted to control a matrix converter 89.

The control strategy generator 8 comprises a switching state provision unit 81 adapted to provide information about switching states associated with the matrix converter 89. For example, the switching state provision unit 81 may indicate all available switching states of the matrix converter, or may indicate only non-rotating switching states of the matrix converter.

The control strategy generator 8 further comprises a switching state identification unit 82, which is adapted to identify a plurality of switching states of the matrix converter. By way of example, the switching state identification unit may identify a plurality of switching states based on a desired input current of the matrix converter or based on a magnitude of output voltage vectors associated with the switching states, as previously described with reference to FIGS. 6A-6C.

The control strategy generator 8 further comprises a circuit simulator 83, which is adapted to simulate an operation of the matrix converter 89. In particular, the circuit simulator 83 comprises models of an AC source 83a (which models an AC source of the matrix converter 89), an input filter 83b, a matrix converter 83c (which models the matrix converter 89) and a load 83d (which models a load of the matrix converter 89). A predicted multi-phase load current (i.e. output current) $i_0$ is output by the circuit simulator.

Each of the plurality of switching states identified by the switching state identification unit is simulated by the circuit simulator. Thus, the model of the matrix converter 83c is controlled according to each of the identified plurality of switching states.

The simulated multi-phase output current $i_0$ is provided to a mathematical transformation unit 84 of the control strategy generator. The mathematical transformation unit 84 mathematically transforms (e.g. using an alpha-beta transformation) the simulated multi-phase current $i_O$ to obtain, for each switching state in the identified plurality of switching states, a predicted output transformation result representing a mathematical transformation result of a predicted output current for the switching state.

Furthermore, the mathematical transformation unit 84 may also obtain a target output transformation result representing a mathematical transformation result of a desired multi-phase output current of the matrix converter. This may be done, for example, by performing a mathematical transformation, such as an alpha-beta transformation, on a desired input current $i_O$.

A switching state selection unit 85 identifies from the plurality of switching states at least three switching states, wherein, when mapped using a Cartesian co-ordinate system, a position of the target output transformation result is contained by an area defined by the positions of the predicted output transformation results associated with the at least three switching states. Thus the switching state selection unit identifies at least three switching states based on the predicted output transformation results and a target output transformation result.

A duty cycle generator 86 determines a duty cycle for each at least three switching states, for example, employing a method previously described.

A control strategy generator 87 generates a control strategy for the matrix converter 89 based on at least the determined duty cycles for each at least three switching states, for example, employing methods previously described. In embodiments, the control strategy generator 87 arranges the at least three switching states into a control pattern based on their determined duty cycles.

In some embodiments, the mathematical transformation unit 84 obtains a mathematical transformation of a predicted output current error based on a predicted output current $i_O$ by the circuit simulator and a desired output current 84a.

Of course, it will be appreciated that in some embodiments, the circuit simulator 83 generates a predicted output current error associated with each switching state, for example based on the desired output current 84a, such that the mathematical transformation unit 84 performs a mathematical transformation of predicted output current errors.

In embodiments, the simulated or mathematical model (e.g. the circuit simulator 83) may be a table or dataset which identifies a predicted output current (or more preferably, a predicted output current error) for each switching state for a variety of different possible loads and/or input currents. Other simulated or mathematical models will be apparent to the skilled person, such as a circuit simulation software package.

Methods according to at least one embodiment may be repeated iteratively, as the predicted output current by the matrix converter may dynamically change dependent upon, for example, changes to the load or a current operation of the matrix converter. A load may react or respond differently for a matrix converter operating in different switching states, which may influence the prediction of the output current for identified switching states.

Particularly advantageous embodiments may include continually attempting to reduce an error of the output current by iteratively determining predicted output current errors associated with identified switching states, and determining a control strategy based on the predicted output current errors, as previously described.

Predicted output currents may be determined based on information about a present switching state of the matrix converter and a present output current. Thus, information about the present or ongoing operation of the matrix converter may be used to predict likely output currents of the matrix converter for different possible switching states. By way of example, information about a present output current may provide information about characteristics of a load of the matrix converter, which may be used to improve a simulation of the load.

Thus a control strategy may be automatically adjusted and changed over a period of time.

According to at least one other embodiment, there is proposed a method of generating a control strategy that enables control over an input current and an output current of the matrix converter.

In particular, a method according to an embodiment may comprise identifying at least five switching states which are used to generate the control strategy.

In a similar manner to methods previously described, identifying at least five switching states may comprise iteratively selecting particular switching states from all possible switching states based on a predicted output current, desired input current and/or a magnitude of output voltage vectors associated with switching states.

Preferably, identifying the at least five switching states comprises identifying at least three switching states according to a method described with reference to at least FIGS. 2 to 7. In particular, the identified at least three switching states may comprise a zero switching state and at least two non-zero switching states.

For the purposes of the hereafter described embodiment, the three identified switching states may comprise a zero switching state, a first non-zero switching state and a second non-zero switching state.

Figure 9A:
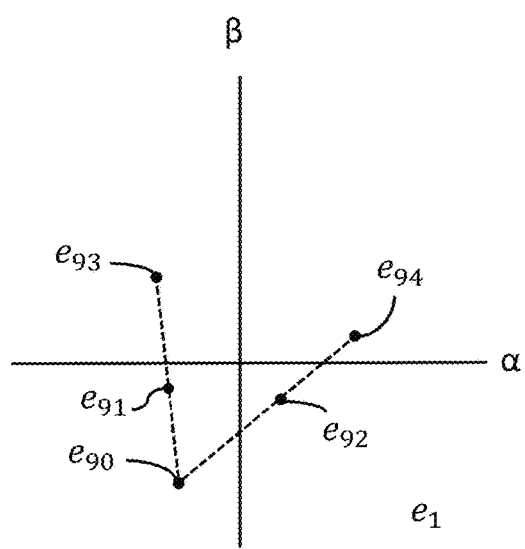
FIGS. 9A and 9B illustrates mathematical transformations of predicted output current and current input respectively, for a plurality of switching state of the matrix converter.

As before, each switching state may be associated with a transformation result of a predicted output current error, which corresponds to a predicted output current error vector. Thus, as illustrated in FIG. 9A, a zero switching state is associated with a zeroth predicted output current error vector $e_{90}$, a first non-zero switching state is associated with a first predicted output current error vector $e_{91}$ and a second non-zero switching state is associated with a second predicted output current error vector $e_{92}$.

The method further comprises identifying at least two further switching states, being a third non-zero switching state and a fourth non-zero switching state. A third predicted output current error vector $e_{93}$ associated with the third non-zero switching state lies substantially on a line intersecting the zeroth predicted output current error vector $e_{90}$ and the first predicted output current error vector $e_{91}$. A fourth predicted output current error vector $e_{94}$ associated with the fourth non-zero switching state lies substantially on a line intersecting the zeroth predicted output current error vector $e_{90}$ and the second predicted output current error vector $e_{92}$.

Figure 9B:
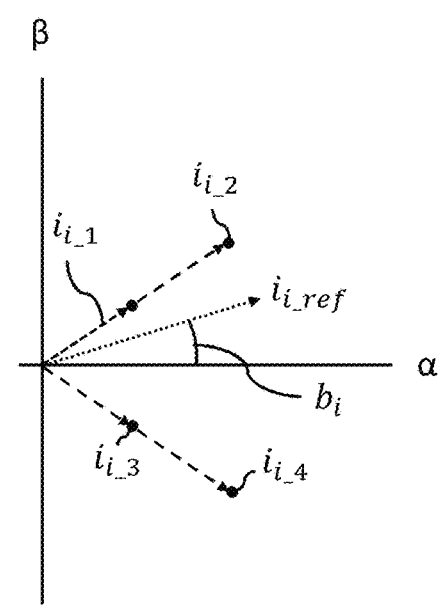

In this way, and as illustrated in FIG. 9B, phase angles of input current vectors associated with the first $i_{i\_1}$ and second $i_{i\_2}$ non-zero vectors are the same, and phase angles of input current vectors associated with the third $i_{i\_3}$ and fourth $i_{i\_4}$ non-zero vectors are the same. However, a magnitude of the first and third non-zero input current vectors may be different, as may a magnitude of the second and fourth non-zero input current vectors.

Once the five switching states have been identified, comprising four non-zero switching states and a zero switching state, a control strategy for the matrix converter may be generated. There is an aim of achieving control of the input current angle as well as maintain zero output current error. It is assumed that the desired input current is in phase with voltage supplied to the matrix converter (i.e. from a voltage supply).

With particular reference to FIG. 9B, the selected four non-zero switching states are each associated with a respective input current vector, which represent a transformation result. Thus, a first non-zero switching state is associated with a first input current vector $i_{i\_1}$, a second non-zero switching state is associated with a second input current vector $i_{i\_2}$ a third non-zero switching state is associated with a third input current vector $i_{i\_3}$ and a fourth non-zero switching state is associated with a fourth input current vector $i_{i\_4}$. An input current associated with the zero switching state is 0, such that an input current vector of the zero switching state is a zero vector located at the origin.

A reference input current vector $i_{i\_ref}$ may be obtained from the voltage supply, having a reference input current vector angle $b_i$. For example, the reference input current vector may be obtained from a multi-phase voltage output by the voltage (as it may be assumed that the voltage output of the voltage supply should be synchronised with the input current to the matrix converter).

A linear combination of the identified five switching states may be identified to meet both output current vector requirements and input current vector requirements by solving the following set of linear equations:

$$(e_{91\alpha}-e_{90\alpha})\cdot d_1+(e_{92\alpha}-e_{90\alpha})\cdot d_2+(e_{93\alpha}-e_{90\alpha})\cdot d_3+ (e_{94\alpha}-e_{90\alpha})\cdot d_4=e_{90\alpha} \quad (11)$$

$$(e_{91\beta}-e_{90\beta})\cdot d_1+(e_{92\beta}-e_{90\beta})\cdot d_2+(e_{93\beta}-e_{90\beta})\cdot d_3+(e_{94\beta}-e_{90\beta})\cdot d_4=-e_{90\beta} \quad (12)$$

$$(-i_{i\_1\alpha}\sin(bi)+i_{i\_1\beta}\cos(bi))\cdot d_1+(-i_{i\_3\alpha}\sin(bi)+i_{i\_3\beta}\cos(bi))\cdot d_3=0 \quad (13)$$

$$(-i_{i\_2\alpha}\sin(bi)+i_{i\_2\beta}\cos(bi))\cdot d_2+(-i_{i\_4\alpha}\sin(bi)+i_{i\_4\beta}\cos(bi))\cdot d_4=0 \quad (14)$$

$$d_1+d_2+d_3+d_4+d_5=1 \quad (15)$$

and $d_1$, $d_2$, $d_3$, $d_4$ are the duty cycles for each respective non-zero switching state and $d_0$ is the duty cycle for the zero switching state.

At least one embodiment provides a method of generating a control strategy, which uses multiple switching states, based on a single analysis of a desired output current. Such a control strategy provides a fast response to a change in demanded output current with a high degree of accuracy and low total harmonic distortion. The control strategy may be iteratively generated to repeatedly ensure a suitable current is output.

The control strategies described herein enable a fixed or predictable switching frequency of the matrix converter to be provided, which increases an ease in the design of an input filter.

Although above described embodiments relate to a three-phase to three-phase matrix converters, it will be understood that matrix converters according to other embodiments of the invention may be connected to an input supply of an arbitrary number of phases, such as a two-phase supply or a four-phase supply. Conceivably, embodiments may be applied to matrix converters adapted to output a converted supply of an arbitrary number of phases, such as two-phase, four-phase or five-phase outputs.

Proposed embodiments enable modification of the method (e.g. at saturation or an over-modulation condition) to prioritize control of input and/or output currents. In particular, the method may be modified to prioritize control of input currents (i.e. rather than output currents), depending on the requirements. This may be performed by obtaining predicted input currents and appropriate transformation results thereof.

In some embodiments, there may be provided a system comprising a processing arrangement adapted to carry out any method previously described with reference to FIG. 1 to 7, 9A or 9B.

Figure 10:
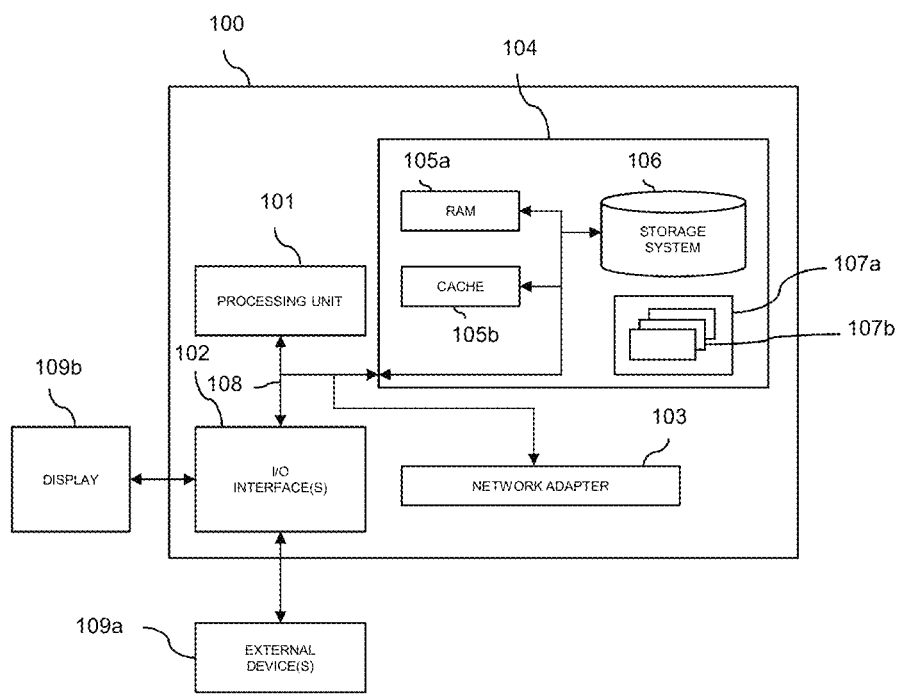
FIG. 10 illustrates a system according to an embodiment.

By way of example, as illustrated in FIG. 10, embodiments may comprise a computer system 100. The components of computer system/server 101 may include, but are not limited to, one or more processing arrangements, for example comprising processors or processing units 101, a system memory 104, and a bus 108 that couples various system components including system memory 104 to processing unit 101.

Bus 108 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 100 typically includes a variety of computer system readable media. Such media may be any available media that is accessible by computer system/server 100, and it includes both volatile and non-volatile media, removable and non-removable media.

System memory 104 can include computer system readable media in the form of volatile memory, such as random access memory (RAM) 105a and/or cache memory 105b. Computer system/server 100 may further include other removable/non-removable, volatile/non-volatile computer system storage media. By way of example only, storage system 104 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 90 by one or more data media interfaces. As will be further depicted and described below, memory 104 may include at least one program product having a set (e.g., at least one) of program modules that are configured to carry out the functions of embodiments of the invention.

Program/utility 107a, having a set (at least one) of program modules 107b, may be stored in memory 104 by way of example, and not limitation, as well as an operating system, one or more application programs, other program modules, and program data. Each of the operating system, one or more application programs, other program modules, and program data or some combination thereof, may include an implementation of a networking environment. Program modules 108b generally carry out the functions and/or methodologies of embodiments of the invention as described herein.

Computer system/server 100 may also communicate with one or more external devices 109a such as a keyboard, a pointing device, a display 109b, etc.; one or more devices that enable a user to interact with computer system/server 100; and/or any devices (e.g., network card, modem, etc.) that enable computer system/server 100 to communicate with one or more other computing devices. Such communication can occur via Input/Output (I/O) interfaces 102. Still yet, computer system/server 100 can communicate with one or more networks such as a local area network (LAN), a general wide area network (WAN), and/or a public network (e.g., the Internet) via network adapter 103. As depicted, network adapter 103 communicates with the other components of computer system/server 100 via bus 108. It should be understood that although not shown, other hardware and/or software components could be used in conjunction with computer system/server 100. Examples, include, but are not limited to: microcode, device drivers, redundant processing units, external disk drive arrays, RAID systems, tape drives, and data archival storage systems, etc.

FIGS. 11A and 11B illustrate experimental results of a system having a three-phase output matrix converter, wherein the matrix converter is controlled by a control strategy generated by a method as previously described with reference to at least FIGS. 1 to 6C and 8.

TABLE 1

| Parameter | Value | Unit |
| --- | --- | --- |
| Filter inductance | 0.7 | mH |
| Filter capacitance (delta) | 8.3 | μF |
| Damping resistor | 15 | Ω |
| Load inductance | 3.75 | mH |
| Load resistance | 10 | Ω |
| Switching frequency | 12.5 | kHz |
| Supply Voltage(rms) | 90 | V |

Table 1 illustrates exemplary parameters for the system underdoing experimentation. The filter inductance and capacitance is for a filter which filters an AC source provided to a matrix converter (having a Supply Voltage) previously described (such as input filter 83*b*). The input filter consists of a LC filter with a damping resistor (of damping resistance) parallel to the inductor. The input filter may be required to attenuate switching frequency harmonics. The system has a load of a load inductance and load resistance. A switching frequency indicates a switching frequency of the matrix converter.

Consider a scenario in which a load current of 5 A at 30 Hz is demanded from the system, which results in a three phase output currents as illustrated by a first diagram 111 of FIG. 11A. In particular, there is illustrated a voltage output associated with a first phase 111A, a second phase 111B and a third phase 111C. FIG. 11A also illustrates a second diagram 112 showing a matrix converter output line voltage 112 and a third diagram illustrating a harmonic spectrum 113 (of one of the three-phases).

The harmonic spectrum indicates harmonics at switching frequency (12.5 kHz) and its multiples. This implies that a fixed switching frequency is advantageously generated by proposed control strategy. The total harmonic distortion (THD) of the controlled waveform is about 3.97%.

In order to test the transient behavior of the control strategy, a step demand in the magnitude (e.g. from 2 to 5 A) and frequency (e.g. from 20-40 Hz) of the output current of the matrix converter may be requested. That is, the desired output current of the matrix converter may be changed from a current with magnitude 2 A, frequency 20 Hz to a current with magnitude 5 A, frequency 40 Hz.

The resulting load current waveforms are illustrated in FIG. 11B and indicates the fast transient response achieved by this method.

In particular, FIG. 11B indicates the three phase load current 114 for a step in demand, which illustrates a fast response to a change in desired output current. That is, the output current of the matrix device immediately responds to the change in desired current.

FIG. 11B also illustrates a mathematical (e.g. alpha-beta) transformation result 115 of the three phase output current by the matrix converter, represented by a first 115A and second 115B line. Here, the first line 115A represents an instantaneous alpha-part of the transformation result, and the second line 115B represents an instantaneous beta-part of the transformation result.

Due to the low total harmonic distortion, it may be understood that a described method provides a quick and responsive control strategy for the matrix converter with low harmonic distortion.

Embodiments described herein relate to a method of generating a control strategy for a multi-phase output matrix converter operably in a plurality of switching states. Such a method comprises obtaining a desired multi-phase output current of the matrix converter, obtaining predicted multi-phase output currents of the matrix converter operating in particular switching states, and determining a control strategy based on the desired multi-phase output current and the predicted multi-phase output currents.

In particular embodiments, mathematical transformations of the desired output current and the predicted output currents are used to identify at least three switching states for use in a control strategy.

Other variations to the disclosed embodiments can be understood and effected by those skilled in the art in practicing the claimed invention, from a study of the drawings, the disclosure, and the appended claims. Other bidirectional switches than explicitly herein disclosed will be known to the person skilled in the art, for example, a diode bridge bi-directional switch cell. In the claims, the word "comprising" does not exclude other elements or steps, and the indefinite article "a" or "an" does not exclude a plurality. The mere fact that certain measures are recited in mutually different dependent claims does not indicate that a combination of these measured cannot be used to advantage. Any reference signs in the claims should not be construed as limiting the scope.

The invention claimed is:

1. A method of generating a control strategy for a matrix converter, the method comprising:
   with one or more processors:
   obtaining a target output transformation result representing a mathematical transformation result of a desired multi-phase output current of the matrix converter;
   obtaining, for each of a plurality of switching states of the matrix converter, a predicted output transformation result representing a mathematical transformation result of a predicted output current for the switching state;
   obtaining, for each of the plurality of switching states, a predicted error between the predicted output transformation result associated with the switching state and the target output transformation result;
   identifying from the plurality of switching states at least three switching states having predicted errors that, when mapped using a Cartesian co-ordinate system, have positions defining an area that contains a zero error position; and generating a control strategy for the matrix converter based on the at least three switching states.

2. The method of claim 1, wherein the obtaining, for each switching state in the plurality of switching states, the predicted output transformation result comprises obtaining, for each switching state, a predicted output transformation result from a simulated or mathematical model of the matrix converter and a load of the matrix converter.

3. The method of claim 1, wherein the obtaining, for each switching state in the plurality of switching states, the predicted output transformation result comprises:

predicting, using a simulated or mathematical model of the matrix converter and a load of the matrix converter, an output current of the matrix converter associated with each switching state in the plurality of switching states; and performing a mathematical transformation on the predicted output current associated with each switching state to thereby obtain a predicted output transformation result for each switching state in the plurality of switching states.

4. The method of claim 1, wherein generating the control strategy comprises:

calculating a duty cycle for the at least three switching states based on the target output transformation result; and generating the control strategy for the matrix converter based on the calculated duty cycles.

5. The method of claim 1, wherein the mathematical transformation is an alpha-beta transformation, such that the target output transformation result represents an alpha-beta transformation result of a desired multi-phase output current of the matrix converter and each predicted output transformation result represents an alpha-beta transformation result of a predicted output current for a respective switching state.

6. The method of claim 1 wherein the zero error position corresponds to an origin of the Cartesian co-ordinate system.

7. The method of claim 1 wherein generating the control strategy comprises identifying a linear combination of predicted error vectors corresponding to the at least three switching states that results in zero current error.

8. A method of generating a control strategy for a matrix converter, the method comprising:

with one or more processors:

obtaining a target output transformation result representing a mathematical transformation result of a desired multi-phase output current of a matrix converter;

identifying, based on one or more of output voltage and desired input current, a reduced set of switching states from a set of possible switching states of the matrix converter;

obtaining, for each switching state in the reduced set of switching states of the matrix converter, a predicted output transformation result representing a mathematical transformation result of a predicted output current for the switching state; and identifying from the reduced set of switching states at least three switching states having corresponding predicted output transformation results that, when mapped using a Cartesian co-ordinate system, have positions defining an area that contains a position of the target output transformation result, at least one of the at least three switching states corresponding to a zero switching state; and generating a control strategy for the matrix converter based on the at least three switching states.

9. The method of claim 8, wherein the obtaining, for each switching state in the reduced set of switching states, a predicted output transformation result comprises, obtaining, for each switching state, a predicted output transformation result from a simulated or mathematical model of the matrix converter and a load of the matrix converter.

10. The method of claim 8, wherein the obtaining, for each switching state in the reduced set of switching states, a predicted output transformation result comprises:

predicting, using a simulated or mathematical model of the matrix converter and a load of the matrix converter, an output current of the matrix converter associated with each switching state in the reduced set of switching states; and performing a mathematical transformation on the predicted output current associated with each switching state to thereby obtain a predicted output transformation result for each switching state in the reduced set of switching states.

11. The method of claim 8 wherein the area is defined by a shape having a vertex at a position of a predicted output transformation result corresponding to the zero switching state.

12. The method of claim 8 wherein generating the control strategy comprises identifying a linear combination of vectors corresponding to the at least three switching states that results in a target current vector associated with the target output transformation result.

13. A control strategy generator for a matrix converter, comprising:

one or more processors adapted to:

obtain a target output transformation result representing a mathematical transformation result of a desired multi-phase output current of the matrix converter;

identify, based on one or more of output voltage and desired input current, a reduced set of switching states from a set of possible switching states of the matrix converter;

obtain, for each switching state in a reduced set of switching states of the matrix converter, a predicted output transformation result representing a mathematical transformation result of a predicted output current for the switching state;

identify from the reduced set of switching states at least three switching states having corresponding predicted output transformation results that, when mapped using a Cartesian co-ordinate system, have positions defining an area that contains a position of the target output transformation result, at least one of the at least three switching states corresponding to a zero switching state; and generate a control strategy for the matrix converter based on the at least three switching states.

14. The control strategy generator of claim 13 wherein the one or more processors are further adapted to obtain, for each switching state, a predicted output transformation result from a simulated or mathematical model of the matrix converter and a load of the matrix converter.

15. The control strategy generator of claim 13, wherein the one or more processors are further adapted to:

predict, using a simulated or mathematical model of the matrix converter and a load of the matrix converter, an output current of the matrix converter associated with each switching state in the reduced set of switching states; and perform a mathematical transformation on the predicted output current associated with each switching state to thereby obtain a predicted output transformation result for each switching state in the reduced set of switching states.

16. The control strategy generator of claim 13 wherein the area is defined by a shape having a vertex at a position of a predicted output transformation result corresponding to the zero switching state.

17. The control strategy generator of claim 13 wherein generation of the control strategy by the one or more processors includes identifying a linear combination of vectors corresponding to the at least three switching states that results in a target current vector associated with the target output transformation result.

18. A control strategy generator for a matrix converter, comprising:
one or more processors adapted to:
obtain a target output transformation result representing a mathematical transformation result of a desired multi-phase output current of the matrix converter;
obtain, for each of a plurality of switching states of the matrix converter, a predicted output transformation result representing a mathematical transformation result of a predicted output current for the switching state;
obtain, for each of the plurality of switching states, a predicted error between the predicted output transformation result associated with the switching state and the target output transformation result;
identify from the plurality of switching states at least three switching states having predicted errors that, when mapped using a Cartesian co-ordinate system, have positions defining an area that contains a zero error position; and
generate a control strategy for the matrix converter based on the at least three switching states.

19. The control strategy generator of claim 18 wherein the zero error position corresponds to an origin of the Cartesian co-ordinate system.

20. The control strategy generator of claim 18 wherein generation of the control strategy by the one or more processors includes identifying a linear combination of predicted error vectors corresponding to the at least three switching states that results in zero current error.

* * * * *